United States Patent Office 3,529,999
Patented Sept. 22, 1970

3,529,999
METHOD FOR CLEANING NATURAL AND ARTIFICIAL STONES
David Boeniger, 287 Seefeldstrasse, Zurich, Switzerland
No Drawing. Filed May 15, 1968, Ser. No. 729,398
Claims priority, application Switzerland, May 19, 1967, 7,076/67
Int. Cl. B08b 3/08
U.S. Cl. 134—2
12 Claims

ABSTRACT OF THE DISCLOSURE

Stone surfaces can be cleaned when using a mixture for treating same which contains an alkali metal hydroxide, the salt of the same specific alkali metal used with a weak acid, and a thickening agent, the treating time being limited by the fact that the treating mixture must not be allowed to dry completely on the stones. Afterwards, the treating mixture is washed away with water or steam, and a neutralizing solution may be used thereon if very alkali sensible stones are concerned.

BACKGROUND OF THE INVENTION

Field of the invention

The present invention relates to the cleaning of stones. More particularly, the present invention relates to an improved method for cleaning natural and artificial stones using an aqueous treating mixture.

The present invention finds broad application in the cleaning of natural and artificial stones, particularly of external faces of buildings which are made of or contain natural and artificial stones or materials made from stones and/or having the properties of stones.

It is known that the surface of stones which are exposed to the atmosphere, will alter after a certain time. This alteration is due to the attack of non-inert components of the atmosphere, e.g. moisture, oxygen, carbon dioxide, sulfurous oxide, nitric acid, ozone, and/or to the deposit of liquid or solid contaminants, particularly in urban, suburban and industrial areas, e.g. sulfuric acid droplets, oil droplets, tar, soot, iron oxides (from rails), cement and lime dust, exhaust gas components, etc.

The aspect of the stones therefore becomes unpleasant, and there is a constant necessity to clean the stone surfaces in more or less regular intervals. Cleaning is also necessary to remove substances which attack the surface of the stones.

Description of the prior art

In the cleaning of stones it has been known to use specially mechanical processes. The most simple one consists in trimming or dressing the surface of the stones to be cleaned by the stone-mason using chisels and brick hammer, or carborundum grinding wheels. This process is extremely time-consuming and expensive and alters the stone surface to a great extent.

Another known process is the cleaning of stone surfaces by sand blasting. This process results equally in a considerable erosion of the stones, particularly where rather soft stones, like sandstone, are concerned, and it has been observed that edges and crests are rounded off and sculptures are deformed and even destroyed. Furthermore, if facades of buildings must be cleaned which contain surface treated metal parts, as anodized aluminum or painted steel, iron or aluminum, the surface treatment or protective layer is destroyed or damaged. In all cases, the sand blasting process results in an enormous dust development.

In a further known method, pneumatically driven tools are used. In this process too, the stones undergo considerable substance loss. Furthermore, damages may occur which are caused by vibration. The process cannot avoid that ornaments are ruined, and, above all, the neighborhood and the workmen are seriously troubled by the noise of this method.

Therefore, it has been tried to use wet cleaning processes. In one of them, the stones are treated with aqueous sodium hydroxide.

The cleaning properties of sodium hydroxide on stones have been known for a long time. The use of such solutions, however, is far from being satisfactory since the caustic cannot be completely removed by washing from the surface of the stones.

The remaining residues of the caustic become dry, the caustic concentrates thereby, and the dry residue is transformed, by acidic components of the stones and the surrounding atmosphere, into salts like carbonates, silicates and nitrates. These salts become visible, on the surface of the stones, in the form of unpleasant specks and efflorescences. The known process therefore proposes to neutralize chemically the sodium hydroxide residues by post-treating the stone surface with an aqueous acid solution. But this brings about still other drawbacks: The overall cleaning operation becomes more expensive; metal parts which may be present as it is the case at various facades are corroded, and some stones are undesirably attacked by the acid, in particular carbonate containing stones.

Objects of the invention

Accordingly, it is an object of the present invention to provide an improved method for cleaning natural and artificial stones by chemically treating their surfaces.

It is another object of the present invention to provide a cleaning method which is easy to perform, economical, effective, and which does not present the above discussed drawbacks.

It is still another object of the present invention to provide an aqueous treating mixture for use in the method of the invention which mixture can be used, in nearly all cases as the sole treating agent.

A further object of the invention is to provide a solution which may optionally be used for post-treating the stone surface and for neutralizing the residues of the main treating mixture without attacking the stones and other materials associated therewith.

Still other objects and features of the invention will become evident from the description which follows.

SUMMARY OF THE INVENTION

The applicant has surprisingly found that the shortcomings mentioned above can be avoided and stones of all kinds can be treated to clean them with excellent and durable results when the stones are brought in contact, on their surface, with an aqueous treating mixture which contains an alkali metal hydroxide, a salt of this same alkali metal with a weak acid, a thickening agent and water, the contact time being at most such that the treating mixture is not allowed to dry completely on the stones, and washing thereafter the stones with water or steam.

By the expression "natural and artificial stones" as used throughout this specification and the claims, all materials are understood which are concreted earthy or mineral matter or a rock or rocklike matter, as a construction or ornamental material, especially for building. This material may be, in the case of natural stones, won from mineral occurences, or particulate natural minerals may be transformed by the methods known in the art to stone-like materials which are named artificial stones.

Examples of natural stones which can be cleaned by the method of the present invention are: Sandstone, limestone, marble, granite, gneiss, quartzite, lime-silicate rock, porphyry, basalt, conglomerate, siltstone, shale, dolomite, claystone, slate, phyllite, schist, etc. Among the artificial stones the different bricks are the most important ones, but other artificial stones can be cleaned, e.g. concrete, terracotta, ceramic ware, enamels, porcelain, stoneware, glasses, etc. It must be noted that the material to be cleaned may be of other nature than stone but must have a stone-like surface as defined above. Composite materials as, e.g., glass-coated or enamel-coated metals, are therefore also falling under the definition of "stone" as used herein.

DETAILED DESCRIPTION OF THE INVENTION

Alkali metal hydroxides for use in the method of the invention are LiOH, NaOH, KOH, RbOH, and CsOH. NaOH and KOH are preferred, and NaOH is particularly preferred. Weak acids the alkali metal salts of which can be used are acids the dissociation constant of which is less than about $10^{-3}$ in dilute aqueous solutions, as defined, e.g., in H. Ulich, "Kurzes Lehrbuch der physikalischen Chemie," Darmstadt 1956, p. 164. Examples of such weak acids are formic, acetic, propionic, lactic, citric, boric, carbonic, hydrofluoric, sulfurous, tetraboric, and phosphoric acid. Acetic acid is preferred as its price is low and it does not contaminate the waste waters.

The aqueous treating mixture may be a solution, a dispersion, an emulsion or, preferably, a gel. Thixotropic gels are particularly preferred since they can be easily applied and return to their non-flowing state when mechanical actions on them during application have ceased, so that the gel adheres perfectly on vertical surfaces too and does not channel down the stone walls.

As mentioned above, NaOH is preferred as alkali metal hydroxide. Accordingly, the sodium salts of the above exemplified weak acids must be used. Since acetic acid is the preferred acid, sodium acetate is the preferred salt.

It must be noted that, in preparing the treating mixture of the invention, the salt of the weak acids may be employed in solid or dissolved form. However, it is easier to form the salt in situ by reacting excess alkali metal hydroxide with the free weak acid when available. Often the salts of the weak acids are less expensive than the equivalent amount of the acids; in these cases, the salts may be used.

The presence of a thickening agent or mixtures of different thickening agents in the treating mixtures is very important for providing a suitable viscosity or for forming the desired gel. The nature of the thickener is generally not critical but it has been found that in some cases the thickening agent acts as a protective substance to avoid attack of he clean stone surface by the alkali of the treating mitxure. Furthermore, strongly hydrophilic thickening or gel-forming agents are preferred in order to reduce the vapor pressure of the treating mixture. This will be discussed in detail below. In some cases, when organic solvents are present in the treating mixture, thickening agents may be used which have hydrotropic properties.

Examples of thickening agents which may be used in the treating mixture of the invention are potato starch, corn starch, wheat flour, corn flour, acacia gum, carragheen, tragacanth, guar gum, gelatin, agar, irish moss, cellulose, alkylcelluloses as methyl cellulose, ethyl cellulose and benzyl cellulose, cellulose esters as acetyl cellulose or cellulose acetobutyrate or acetopropionate, carboxymethylcellulose (CMC), hydroxyalkylcelluloses as hydroxyethyl cellulose, polyvinyl alcohols, polyacrylic acid and their sodium or potassium salts, polymethacrylic acid, etc. Preferred thickening agents are starch, polyvinyl alcohol and CMC; potato starch is specially preferred.

As mentioned above, the time of contact between stone surface and the treating mixture must be limited so that the treating mixture is not allowed to dry completely on the stones. This time space depends of the surrounding conditions of atmospheric temperature and humidity as well as of the specific composition of the treating mixture, so that typical values of this time space cannot be given. However those skilled in the art will easily determine the ultimate moment where the treating must be stopped and the treating mixture must be removed, namely, when the surface of the treating mixture layer will show fissures and crevices. Mixtures with a relatively high content of thickening agents and/or caustic and/or salts of the weak acid show a considerably lower vapor tension than relatively diluted mixtures. Furthermore, when the mixture becomes more concentrated the vapor pressure tends to decrease accordingly so that, in most cases and at normal relative humidities of the atmosphere of about 35 to 85%, and normal temperatures of from about 10° C. to about 30° C., an equilibrium will establish between moisture contents of the atmosphere and of the treating mixtures so that the mixture will not completely dry at all even if treating times of several days are applied. In general, treating times of between 0.5 and 15 hours at about 20° C. and between 2 and 48 hours at about 5° C. are satisfactory.

The amounts of thickening agent, alkali metal hydroxide and alkali metal salt of the weak acid which may be present in the treating mixture will depend from the viscosity required and the degree of contamination of the surfaces to be cleaned. Generally spoken, the following amounts are satisfactory, in percents by weight:

thickening agent: 0.1–20, preferably 0.5–10
alkali metal hydroxide: 1–40, preferably 2–20
alkali metal salt of weak acid: 5–60, preferably 5–40.

If stones are to be cleaned which are very porous and/or most sensitive to caustics, as sandstones, a neutralizing post-treatment may be used to remove all traces of caustic on the stones. Since the alkaline strength of the novel treating mixture is considerably moderated by the presence of thickener and the salt of the weak acid, neutralizing solutions of moderate strength can satisfactorily be used. It is preferred that a neutralizing solution be used which contains the weak acid a salt of which is used in the treating mixture, in free and diluted form. Weak acids which can be used have been exemplified above.

The treating mixture and the neutralizing solution which is optionally employed may contain further ingredients and components which are able to adapt these mixtures to special uses, especially wetting agents which may be of ionic or nonionic nature. These wetting agents or surface active substances are commonly known; some non-limiting examples are: alkali metal or ammonium or amine soaps of long chain fatty acids, sulfuric esters of fatty alcohols, sulfurized fatty acids, alkylsulfonic acids and their salts, alkylarylsulfonates, olefine sulfonates, alkylphenylpolyglycol ethers, ethoxylated hydroxy compounds, polyamine derivatives, sulfates of polyglycolethers, and so on. Generally, the amount of wetting agent in the treating mixture and/or the neutralizing solution is between 0.01 and 5% by weight, preferably from 0.1 to 3% by weight. Of course, the wetting agent to be used must be compatible with the specific mixture.

Other optional components of the treating mixture are organic solvent, e.g. in order to dissolve tarry or oily contaminations, e.g. hydrocarbons as benzene, toluene, naphthalene, xylene; halohydrocarbons like mono or polychloro or -bromoethanes, -propanes or -cyclohexanes, mono- or polychloro- or -bromobenzene, -toluene, -xylene or -naphthalene; oxygen containing compounds like acetone, cyclohexanone or other ketones, ethyl, propyl or butyl alcohols or cyclohexanol, phenol, cresol, glycols, glycol ethers and the ike, easily soluble or dispersable compounds like acetone, methyl isopropyl ketone, phenol or cyclohexanone being preferred; hydrotropic substances like isopropanol or sodium xylene sulfonate; or fillers like silica, alumina, diatomaceous earth, fuller earth and the like.

It should further be noted that the effect of the treating mixture is more uniformly maintained for a longer period due to the buffering action of the weak acid salt, than with the use of the prior art mixtures.

The treating mixture and the optional neutralizing solution may be applied on the surface of the stones to be cleaned in any suitable manner. Application by jet spraying using a spray gun, or by paint brush or roller is commonly preferred.

Washing may begin when the treating mixture is so concentrated as to contain 10% or more by weight of the alkali metal hydroxide; sometimes, this concentration may be allowed to rise until 15%, 20%, 25% or 30% or even more. This will depend on the initial concentration of the alkali metal hydroxide in the treating mixture and the concentration of the other components.

EXAMPLE I

In a reaction vessel equipped with an effective agitator, 55 kg. of a 30.3% by weight aqueous sodium hydroxide solution are mixed with 28 kg. of water. After 10 minutes, when a homogeneous solution has been formed, 3 kg. of potato starch are added, proportionwise under vigorous stirring. The starch swells in the warm mixture which can be used immediately.

EXAMPLE II

Following the process of Example I, 3 kg. of powdered corn starch, 55 kg. of a 30.3% by weight aqueous sodium hydroxide solution and 42 kg. of a 33% by weight aqueous acetic acid are mixed. A warm viscous mixture is obtained which is ready to be sprayed upon the surface of stones to be cleaned.

EXAMPLE III

In a reaction vessel equipped with an effective stirring device, 52.5 kg. of a commercial hydrated sodium acetate ($NaC_2H_3O_2.3H_2O$) are dissolved in 68.5 kg. of water are added. To this solution, 40.8 kg. of a 30.3% by weight commercial aqueous sodium hydroxide solution (36° Bé.) are added under stirring. While the mixture is vigorously stirred, 5 kg. of potato starch are added proportionwise. Stirring is continued until the mixture has reached its maximal viscosity.

EXAMPLE IV

To the mixture of Example III, 1.7 kg. of "Teepol" (a higher alkylsulfate sold by SHELL) are added. The mixture shows very good cleaning properties on oil soiled stone surfaces.

EXAMPLE V

The process of Example III is repeated with the exception that 3 kg. "Mowiol 30–98," a polyvinylalcohol hydrolysed at 98%, sold by Hoechst, is used instead of the 5 kg. of potato starch. The resulting mixture is particularly suitable for brush application.

EXAMPLE VI

The process of Example III is repeated with the exception that 4.5 kg. "Tylose MH 1000," a methylcellulose sold by Kalle, is used instead of the 5 kg. of potato starch. The resulting mixture is more viscous than that of Example III and is suitable for brush application.

EXAMPLE VII

In a reaction vessel equipped with a effective stirrer, 14 kg. of glacial acetic acid are placed. Upon addition of 184 kg. water and 2 kg. "Teepol," a neutralizing solution is obtained.

EXAMPLE VIII

The mixture of Example I was applied with a temperature of 35° C. to a vertical wall of a building. The wall was of concrete with a marble plate, granite ornaments, and anodized aluminum borders fixed thereon. The surface of these materials had been contaminated by a 20 year old city soil except the aluminum borders which were 1 year old and still nearly clean. The mixture was applied a layer of about 3–5 mm. thickness using a paint brush. After 3 hours (atmosphere: 22.5° C., 68% relative humidity, slight wind), the mixture was washed away with 60° C. warm water using about 25 liters for each sq. meter. The stone surface was totally clean, like new, and the aluminum showed no sign of attack or corrosion. After 6 months, the treated surface had not altered. No efflorescence or specks were observed.

EXAMPLE IX

The mixture of Example IV was applied by jet spraying on the surface of a sandstone building contaminated by a 15 year old city soil, under the same conditions of Example VIII. After washing the surface of the facade, it was impregnated with about 2 liters for each sq. meter of the solution of Example VII. After 20 minutes, this solution was washed away with steam.

The stone surface was totally clean and showed no sign of attack or corrosion. After 8 months, the treated surface had not altered.

The embodiments of the invention in which an exclusive property or privilege is claimed are defined as follows:

1. A method of cleaning natural and artificial stone surfaces on facades of buildings, comprising bringing them into contact with an aqueous treating mixture which consists of an alkali metal hydroxide, a salt of the same alkali metal with a weak acid selected from the group consisting of formic, acetic, propionic, lactic, citric, boric, carbonic, hydrofluoric, sulfurous, tetraboric and phosphoric acids, a thickening agent and water, maintaining such contact for a time at most such that the treating mixture is not allowed to dry completely on the stone surfaces, and thereafter washing the stone surfaces with water or steam.

2. The method of claim 1 wherein the alkali metal is sodium and the weak acid is acetic acid.

3. The method of claim 1 wherein a treating mixture consists of about 19 parts by weight of anhydrous sodium acetate, about 8 parts of sodium hydroxide, about 3 parts of potato starch powder and about 70 parts of water.

4. The method of claim 1 wherein the treating mixture is used between its solidification point and boiling point.

5. The method of claim 1 wherein the treating mixture consists of potato starch powder, a sodium hydroxide solution of about 36° Bé., glacial acetic acid and water and is used in the warm state of its preparation.

6. The method of claim 1 wherein the treating mixture contains also a wetting agent.

7. A method for cleaning porous, tender and alkali sensitive stones on facades of buildings comprising bringing their surfaces into contact with an aqueous treating mixture which consists of an alkali metal hydroxide, a salt of the same alkali metal with a weak acid selected from the group consisting of formic, acetic, propionic, lactic, citric, boric, carbonic, hydrofluoric, sulfurous, tetraboric and phosphoric acids, a thickening agent and water, maintaining such contact for a time at most such that the treating mixture is not allowed to dry completely on the stone surfaces, thereafter washing the stone surfaces with water or steam, and finally applying on the washed stone surfaces a neutralizing solution containing a weak acid of the treating mixture in free and diluted form, and thereafter further washing the neutralized stone surfaces with water or steam.

8. The method of claim 7 wherein the alkali metal is sodium and the weak acid is acetic acid.

9. The method of claim 7 wherein said treating mixture consists of about 19 parts by weight of anhydrous sodium acetate, about 8 parts of sodium hydroxide, about 3 parts of potato starch powder and about 70 parts of water.

10. The method of claim 7 wherein the treating mixture is used between its solidification point and boiling point.

11. The method of claim 7 wherein the treating mixture consists of potato starch powder, a sodium hydroxide solution of about 36° Bé., glacial acetic acid and water and is used in the warm state of its preparation.

12. The method of claim 7 wherein the treating mixture also contains a wetting agent.

References Cited

UNITED STATES PATENTS

| | | | |
|---|---|---|---|
| 1,355,074 | 10/1920 | Cleveland | 134—29 |
| 1,449,388 | 3/1923 | Ferrell | 252—160 |
| 2,827,439 | 3/1958 | Helper | 252—159 |
| 2,843,509 | 7/1958 | Arden | 134—42 XR |
| 3,168,478 | 2/1965 | Stefcik | 252—156 XR |

FOREIGN PATENTS

| | | |
|---|---|---|
| 260,331 | 10/1926 | Great Britain. |
| 672,215 | 5/1952 | Great Britain. |

MORRIS O. WOLK, Primary Examiner

J. T. ZATARGA, Assistant Examiner

U.S. Cl. X.R.

134—27; 252—156